United States Patent
King et al.

(10) Patent No.: US 6,211,819 B1
(45) Date of Patent: Apr. 3, 2001

(54) MOBILE STATION LOCATION DETERMINATION IN A RADIO COMMUNICATION SYSTEM

(75) Inventors: Thomas Michael King, Tempe; George Jeffrey Geier, Scottsdale, both of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/384,493

(22) Filed: Aug. 27, 1999

(51) Int. Cl.$^7$ ............................................. H04B 7/185
(52) U.S. Cl. .................. 342/357.09; 342/357.1; 342/357.15
(58) Field of Search ................ 342/357.06, 357.09, 342/357.1, 357.15

(56) References Cited

U.S. PATENT DOCUMENTS

| | | | |
|---|---|---|---|
| 4,445,118 | 4/1984 | Taylor et al. | 343/357 |
| 4,797,677 | 1/1989 | MacDoran et al. | 342/352 |
| 5,119,101 | 6/1992 | Barnard | 342/357 |
| 5,430,657 | * 7/1995 | Kyrtsos | 701/226 |
| 5,731,786 | 3/1998 | Abraham et al. | 342/357 |
| 5,889,492 | 3/1999 | Kurby et al. | 342/357 |
| 5,893,044 | 4/1999 | King et al. | 701/214 |

OTHER PUBLICATIONS

GPS assistance in broadcast mode, P. Agashe, et al., submission to TIA committee TR45.5.2.3, Feb. 16, 1999.
Draft Location Parameters and Message Structure, S. Droste, submission to TIA committee TR45.5.2.3, Apr. 8, 1999.
Preliminary Least Squares Fit Broadcast Message, I. Lin, et al., submission to TIA committee TR45.5.2.3, Apr. 27, 1999.
Point–to–Point and Broadcast Signaling Messages for GPS Capable GSM Mobile Stations, Y. Zhao, submission to TIA committee T1P1, Jul. 6, 1999.

* cited by examiner

*Primary Examiner*—Thomas H. Tarcza
*Assistant Examiner*—Fred H Mull
(74) *Attorney, Agent, or Firm*—Rennie W. Dover (57) ABSTRACT

A method and apparatus for location determination of a mobile station (304) in a fixed radiocommunication system having at least one base station (302) reduces the computational load on the mobile station. Satellite ephemeris information and clock correction information are received at a base station and periodically used to calculate satellite position data. The satellite position data are conveyed to the mobile station. At other times, the satellite ephemeris data is used to calculate curve fit data at the base station. The curve fit data is transmitted to the mobile station, reducing the amount of data conveyed over the communication link and the computation load on the mobile station.

33 Claims, 6 Drawing Sheets

-PRIOR ART-

FIG. 1

-PRIOR ART-

$$\underline{V}(t) = \underline{V} + \underline{V}'(t-T_0) + \underline{V}''(t-T_0)^2$$
$$\underline{X}(t) = \underline{X}_0 + \underline{V}(t-T_0) + (1/2)\underline{V}'(t-T_0)^2 + (1/3)\underline{V}''(t-T_0)^3$$
$$C(t) = C + af1(t-T_0)$$

ALGORITHM FOR COMPUTING 2ND ORDER CURVE FIT PARAMETERS $$\underline{X0} = \underline{X}(T_0)$$
$$\underline{V} = \underline{V}(T_0)$$
$$\underline{V}' = (8*\underline{d2} - \underline{d1})/(2*dt^2)$$
$$\underline{V}'' = 3*(\underline{d2} - 4*\underline{d1})/(4*dt^3)$$
$$C = af0 + af1(T_0 - toc) + tr + Tgd$$

WHERE,
$$dt = T_1 - T_0$$
$$\underline{d1} = (\underline{X}(T_1) - \underline{X}(T_0)) - \underline{V}(T_0)*dt$$
$$\underline{d2} = (\underline{X}(T_2) - \underline{X}(T_0)) - 2*\underline{V}(T_0)*dt$$
$$tr = F*e*SQRTA*SIN(Ek)$$

MOBILE STATION LOCATION DETERMINATION IN A RADIO COMMUNICATION SYSTEM

BACKGROUND OF THE INVENTION

The present invention relates generally to radio communication systems. More particularly, the present invention relates to method and apparatus for mobile station location determination in such a radio communication system.

Radio communication systems generally provide two-way voice and data communication between remote locations. Examples of such systems are cellular and personal communication system (PCS) radio systems, trunked radio systems, dispatch radio networks, and global mobile personal communication systems (GMPCS) such as satellite-based systems. Communuication in these systems is conducted according to a pre-defined standard. Mobile stations, also known as handsets, portables or radiotelephones, conform to the system standard to communicate with one or more fixed base stations.

It is desirable to obtain and communicate physical locations of mobile stations within the system. In the future, such location information will be required. The United States Federal Communications Commission (FCC) has required that radio systems provide physical location information for emergency ("E911") purposes. Further, with location information available for individual mobile stations, position-dependent services and messaging including advertising can be tailored to the user of the mobile station responsive to location of the mobile station.

Current generations of radio communication have only limited location determination capability. In one technique, the position of the mobile station is determined by monitoring mobile station transmissions at several base stations. From time of arrival measurements, the mobile's position can be calculated. The precision of this technique at times may not be sufficient to meet requirements, though.

In another technique, each mobile station is equipped with a receiver suitable for use with a global satellite navigation system such as the Global Positioning System (GPS). The GPS receiver detects transmissions from a constellation of GPS satellites orbiting the Earth.

Using data and timing from the transmissions, the GPS receiver calculates the positions of the satellites and from those positions, its own position. A GPS satellite in orbit moves at about 4,000 meters per second. The satellite has location data defined by a parameter X(t) and velocity data defined by a parameter V(t). The parameters X(t) and V(t) are three dimensional position and velocity vectors for this satellite and are referenced to an earth-centered-earth-fixed Cartesian coordinate system. The GPS system includes 24 satellites, several of which may be in view of the mobile station at any one time. Each satellite broadcasts data according to pre-defined standard format and timing.

Traditionally, the satellite coordinates and velocity have been computed inside the GPS receiver. The receiver obtains satellite ephemeris and clock correction data by demodulating the satellite broadcast message stream. The satellite transmission contains 576 bits of data transmitted at 50 bits per second. The constants contained in the ephemeris data coincide with Kepler orbit constants requiring many mathematical operations to turn the data into position and velocity data. In one implementation, this conversion requires 90 multiplies, 58 adds and 21 transcendental function calls (sin, cos, tan) in order to translate the ephemeris into a satellite position and velocity vector at a single point, for one satellite. Most of the computations require double precision, floating point processing. A receiver must perform this computation every second for every satellite, for up to twelve satellites.

Thus, the computational load for performing the traditional calculation is significant. The mobile must include a high-level processor capable of the necessary calculations. Such processors are relatively expensive and consume large amounts of power. As a portable device for consumer use, a mobile station is preferably inexpensive and operates at very low power. These design goals are inconsistent with the high computational load required for GPS processing.

Further, the slow data rate from the GPS satellites is a limitation. GPS acquisition at a receiver may take many seconds or several minutes, during which time the receiver circuit and processor of the mobile station must be continuously energized. Preferably, to maintain battery life in a portable radio, circuits are de-energized as much as possible. The long GPS acquisition time can rapidly deplete the battery of a mobile station. In any situation and particularly in emergency situations, the long GPS acquisition time is inconvenient and possibly dangerous for the user.

Figure 1:
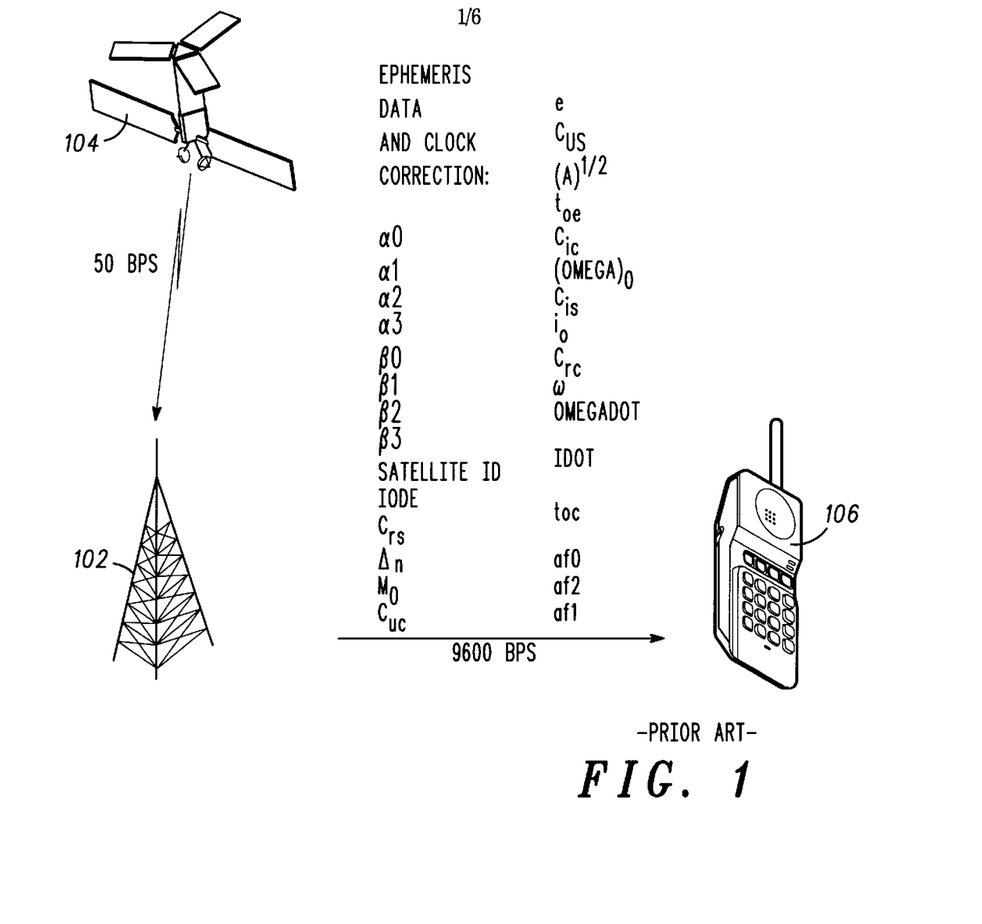
FIG. 1 is a block diagram showing a prior art system communicating satellite ephemeris and clock correction data to a mobile station in a radio communication system.
Figure 2:
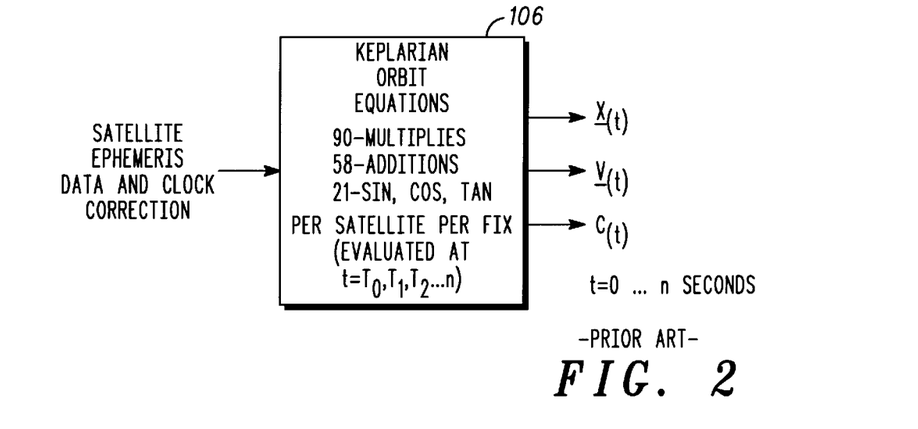
FIG. 2 is a block diagram illustrating calculation of satellite position, velocity and clock correction data in the mobile station of the system of FIG. 1.

One proposal includes receiving the ephemeris and clock correction data at a base station of the radio communication system and transmitting this data over a conventional communication link to the mobile station. FIG. 1 shows a system incorporating this base-to-mobile communication link. A base station 102 receives the 50 bits per second (bps) transmission from a GPS satellite 104. The base station 102 acts as a repeater, gathering the data from the GPS satellite 104 and re-transmitting it at a higher data rate to a mobile station 106. The ephemeris and clock correction data are received at the mobile station and used for calculation of satellite position. From satellite position, mobile station position can in turn be determined. FIG. 2 illustrates the computational requirements for determining the position vector X(t), the velocity vector Y(t) and the clock correction C(t) at the mobile station using the ephemeris data and clock correction data received from the base station.

The illustrated system has some advantages. A greater data rate is possible when using the base-to-mobile communication link. As illustrated in FIG. 1, a conventional cellular system allows data transmission over this link at a typical rate of 9600 bits per second. This allows the mobile receiver circuit to be turned off a greater amount of time, reducing power consumption in the mobile station. However, the high computational load associated with the raw ephemeris data remains.

Another proposed solution stores a GPS almanac at the mobile station. The almanac data are a truncated, reduced precision subset of the ephemeris data. A base station computes location and clock correction information for the almanac and transmits this correction over the communication link to the mobile station. The mobile station determines that it has the proper correction data for its almanac and, if so, computes satellite location and clock data using the almanac.

This system reduces slightly the computational load required of the mobile station. However, the mobile station receiver must still remain energized during transmission of its almanac data and subsequently during all possible transmission times to receive correction data for its almanac. Also, the almanac data must be stored at the mobile station which can increase the size and cost of the mobile station.

Accordingly, there is a need for an improved method and apparatus for location determination in a radio communication system.

DETAILED DESCRIPTION OF THE PRESENTLY PREFERRED EMBODIMENTS

Figure 3:
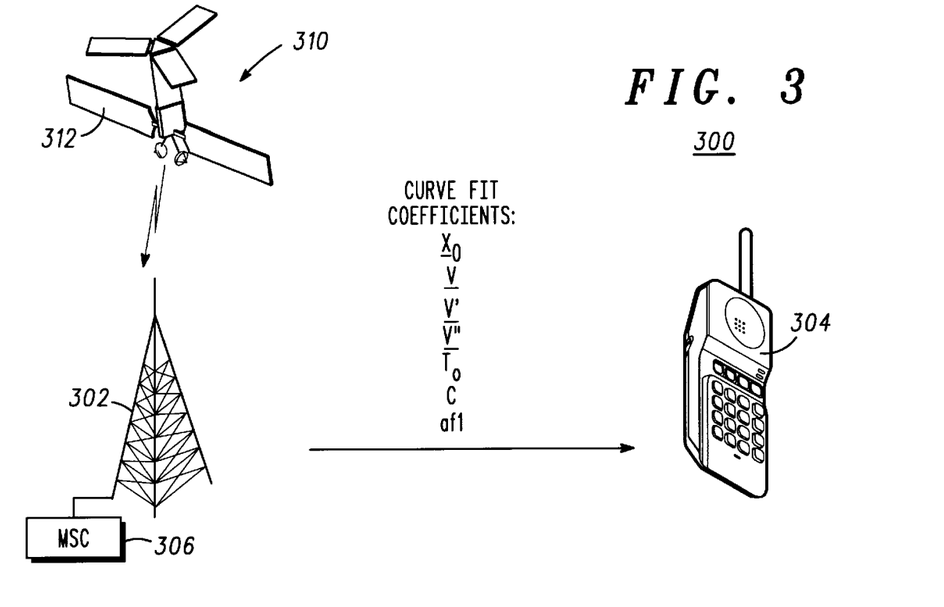
FIG. 3 is a block diagram of a radio communication system.

Referring now to FIG. 3, it shows a block diagram of a radio communication system 300. The system 300 includes one or more base stations such as base station 302, one or more mobile stations such as mobile station 304 and a mobile switching center 306. The base station 302 provides two-way radio communication of voice and data between the base station 302 and mobile stations such as the mobile station 304 located in a predetermined geographic area near the base station 302.

The mobile switching center 306 provides overall control of the system 300. In particular, the mobile switching center 306 controls handoff of communication between the mobile station 304 and two or more base stations such as the base station 302. The mobile switching center 306 is in wire line communication with each base station 304 of the system 300. The mobile switching center 306 in some applications provides connection to other communication systems, such as the public switched telephone network (PSTN).

The system 300 may be configured as any of a wide variety of known or future systems. Such systems including cellular radiotelephone systems, trunked radio systems; satellite radio systems and any other suitable radio communication system. Exemplary cellular systems include cellular systems according to standards such as the Global System for Mobile communications (GSM), code division multiple access (CDMA) systems according to interim standard IS-95, time division multiple access systems according to interim standard IS-136, advanced mobile phone systems (AMPS), and others.

Operated in proximity to the radiocommunication system 300 is a global navigation positioning system 310. The satellite system 310 is independent of the radio communication system 300. In FIG. 3, the system 310 includes at least one satellite 312 in radio communication with radio equipment on the earth. The satellites including satellite 312 are in earth orbit. One example of a suitable global navigation positioning system is the global positioning system (GPS) operated by the United States. Another example is the global orbital navigation satellite system (GLONASS) operated by Russia. Satellites such as the satellite 312 of the system 310 transmit timing and position information for receipt by the receivers on the ground for time keeping and geolocation purposes. In the exemplary embodiment of FIG. 3, the system 310 is the GPS system and the satellite 312 periodically transmits satellite ephemeris information and clock correction information.

For location determination by the mobile station 304 in the radio communication satellite 300, the system 300 receives at the base station 302 satellite ephemeris information and clock correction information for at least one satellite such as satellite 312. Preferably, such information is received for a plurality of satellites including at least four satellites. In the illustrated embodiment, the information is received directly from the satellites themselves using a receiver such as a GPS receiver associated with the base station. However, in alternative embodiments, the information could be received remotely and transmitted to the base station 304. The information could be received at the mobile switching center 306 and communicated to each base station of the system 300.

At the base station 302, satellite position curve fit data and clock correction data are calculated in response to the satellite ephemeris information and clock correction information. Subsequently, the satellite position curve fit data and clock correction data is transmitted from the base station 302 at predetermined intervals. At the mobile station 304, the satellite position curve fit data and clock correction data are received. The mobile station 304 determines a position for the at least one satellite, satellite 312, using the received data. Preferably, the satellite position curve fit data and clock correction data is updated and transmitted every five minutes. However, other time intervals may be suitably selected. In alternative embodiments, the clock correction data may be omitted or combined into the satellite position information to further reduce the amount of data that must be transmitted to the mobile station 304.

Significantly, the mobile station 304 does not need to store satellite almanac data to compute satellite positions. The curve fit data transmitted by the base station 302 is adequate to allow rapid, reliable GPS acquisition without use of almanac data.

In this manner, the computation load imposed upon the mobile station 304 is substantially reduced. As will be described below, estimation of position of the satellite 312 using the curve fit data requires substantially less computational power at the mobile station 304. The computation of satellite position using the curve fit data is only performed periodically, such as once every five minutes. This reduces the complexity of calculations that must be performed in the mobile station 304, reduces storage requirements in the mobile station 304 and reduces power consumption in the mobile station 304.

The illustrated techniques may be extended to any GPS station, independent of operation in a two way radio system such as a cellular system. A mobile station equipped with a local receiver can receive local transmission of satellite position curve fit data transmitted from a terrestrial or local transmitter. The mobile station determines a restricted range of satellite Doppler and code phase search. Since the search range is restricted, acquisition of the satellite signal occurs more quickly. If the mobile station is further equipped with a GPS receiver, satellite position and, in turn, the mobile station position can be determined by a computational element such as a processor of the GPS station. Such a GPS station provides advantages of reduced GPS acquisition time over conventional GPS receivers that use satellite ephemeris or almanac information alone. The local receiver can be relatively inexpensive and low-power and should be suitable for receiving data using any modulation or encoding technique on permitted frequencies. The terrestrial transmitter can be part of another radio system, such as a two-way radio system (cellular and trunked radio systems are examples) or can be a stand-alone transmitter or series of transmitters dedicated to GPS acquisition assist.

Figure 4:
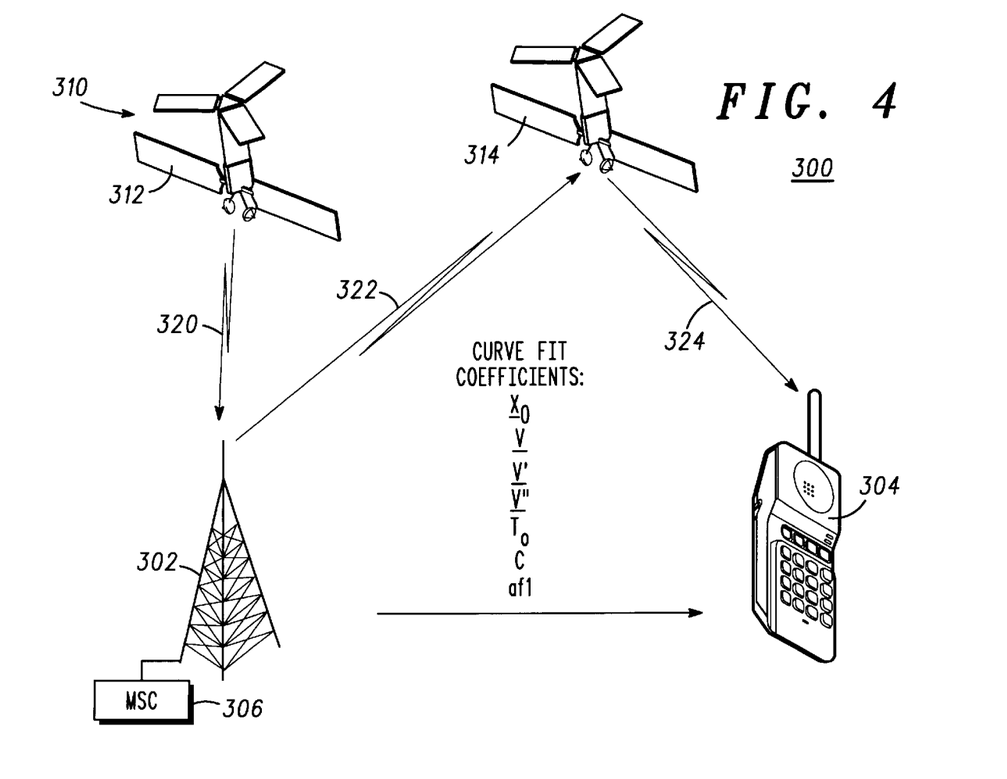
FIG. 4 is a block diagram of a second embodiment of the radio communication system of FIG. 3.

FIG. 4 illustrates an alternative embodiment of the radio communication system 300 of FIG. 3. In FIG. 4, the radio communication system 300 includes a plurality of base stations such as base station 302 in radio communication with one or more mobile stations such as mobile station 304. The system is under control of a mobile switching center 306 which controls handoff of two-way radio communication between the mobile station 304 and two or more base stations such as base station 302.

Operated proximate the radio communication system 300 is a global navigation satellite system 310 including a satellite 312 and a satellite 314. The satellites 312, 314 transmit timing and position information for use by ground based receivers for geolocation purposes. However, the satellite system 310 is independent of the radio communication system 300.

In the embodiment of FIG. 4, the base station 302 receives a transmission 320 from a satellite 312. The transmission 320 includes satellite ephemeris information and clock correction information for at least one satellite, including the satellite 312. The transmission 320 is a conventional transmission, for example of the type provided by the GPS system. After receiving the transmission 320, the base station 302 calculates satellite position and clock correction curve fit data in a manner to be described below.

The curve fit data is subsequently transmitted in a transmission 322 to a satellite of the satellite system 310. Depending on timing, position and other factors, the transmission 322 may be directed back to the satellite 312 or to a different satellite such as satellite 314. After receiving the curve fit data, the satellite 314 transmits in a transmission 324 the curve fit data directly to the mobile station 304. This provides an alternative technique for transmitting the curve fit data from the base station 302 to the mobile station 304.

Figure 5:
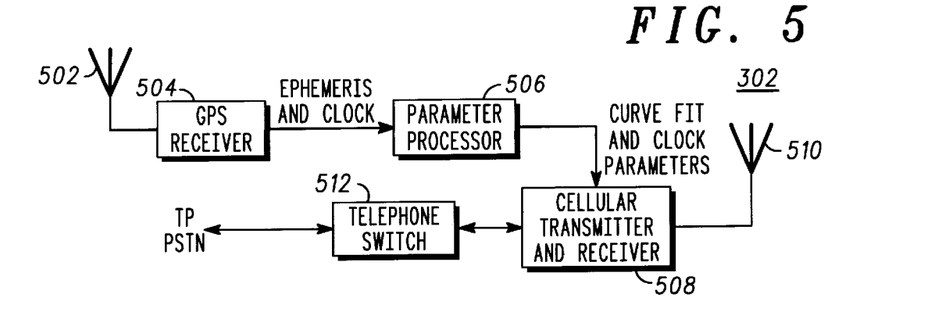
FIG. 5 is a block diagram of a base station of the radio communication system of FIG. 3.

FIG. 5 is a block diagram of a base station 302 for use in the radio communication system 300 of FIG. 3. The base station 302 includes a satellite antenna 502, a satellite receiver 504, a parameter processor 506, a cellular transmitter and receiver 508, a cellular antenna 510 and a telephone switch 512.

The satellite antenna 502 detects radio frequency transmissions from earth orbiting satellites. The received transmissions are conveyed to the satellite receiver 504 which demodulates and decodes the transmitter information in a manner well known in the art. In the embodiment of FIG. 5, the satellite receiver 504 is configured to receive transmissions from a GPS satellite system. However, other satellite systems may be accommodated as well, including, for example, GLONASS, Iridium, GlobalStar and others now known or developed in the future. The GPS receiver 504 decodes satellite ephemeris information and clock correction information from the transmission detected at the satellite antenna 502. The satellite receiver 504 thus forms a means for receiving satellite ephemeris information and clock correction information. In alternative embodiments, this function may be performed by a receiver located remotely from the base station 302.

The satellite ephemeris information and clock correction information are conveyed to the parameter processor 506. The parameter processor 506 may be embodied as any suitable high speed, high precision data processor, such as one or more commercially available microprocessors for data processing the ephemeris information and clock correction information. The function performed by the parameter processor 506 may be performed by the same processor which controls the base station 302 or a processor which controls a cellular call at the base station 302, or the parameter processor 506 may be an independent processor dedicated to position location operations. The parameter processor 506 produces curve fit and clock correction data, as will be described below. The parameter processor 506 thus forms a processor configured to compute satellite position curve fit data in response to the satellite ephemeris information and clock correction information.

The curve fit data are provided to the cellular transmitter and receiver 508. The cellular transmitter and receiver 508 implements two-way voice and data radio communication in accordance with a cellular standard, such as GSM, IS-95, IS-136 or another. The cellular transmitter and receiver 508 formats a message according to the formatting rules of the cellular standard which controls operation of the radiotelephone system in which the base station 302 operates. In addition, the cellular transmitter and receiver 508 may detect a request from a mobile station received at the antenna 510 requesting position information for use in calculating mobile station position. In response to the request, the cellular transmitter and receiver 508 formats a message for transmission to a mobile station using the antenna 510. Thus, the cellular transmitter and receiver 508 forms a transmitter coupled to the processor 506 and configured to broadcast the satellite position curve fit data to all mobiles in the region at predetermined intervals or transmitted individually to particular mobile stations when the mobile station requests the data.

The telephone switch 512 provides two-way communication between the base station 302 and an external communication network, such as the PSTN. The telephone switch 512 may also provide connection to other base stations of the radiocommunication system in which the base station 302 operates. In alternative embodiments, the telephone switch 512 may receive the satellite ephemeris information and clock correction information from a remote location, such as a mobile switching center.

Figure 6:
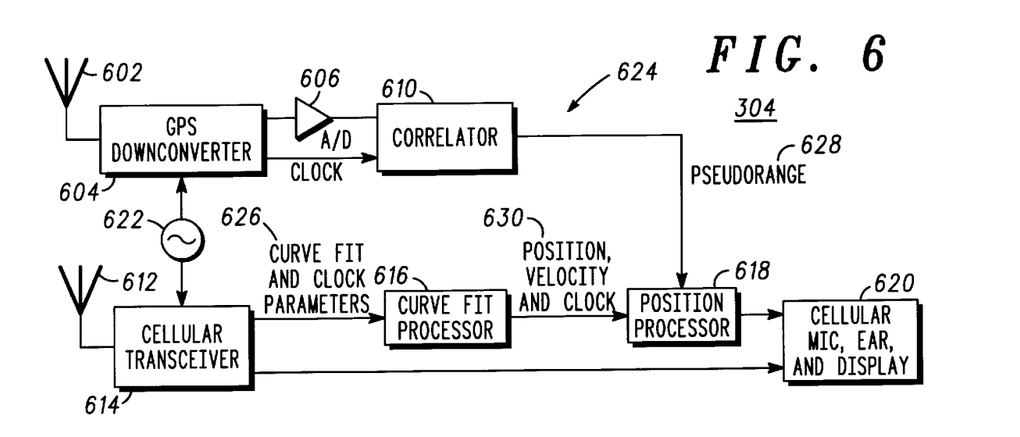
FIG. 6 is a block diagram of a mobile station of the radio communication system of FIG. 3.

FIG. 6 is a block diagram of a mobile station 304 for operation in the radio communication system 300 of FIG. 3. The mobile station 304 includes a satellite antenna 602, a downconverter 604, and analog-to-digital converter (ADC) 606, and a correlator 610. The mobile station 304 further includes a cellular antenna 612, a cellular transceiver 614, a curve fit processor 616, a position processor 618 and a user interface 620.

The downconverter 604 is configured to receive a satellite signal from one or more satellites as detected at the satellite antenna 602. The downconverter 604 operates in response to an oscillator 622 which generates a reference frequency. The satellite receiver 604 in the illustrated embodiment is a GPS downconverter. GPS signals conventionally contain high rate repetitive signals called pseudo-random or pseudo-noise (PN) sequences. The PN codes are called C/A codes and have a binary phase-reversal rate of 1.023 MHz and a repetition period of 1023 chips for a code period of 1 msec. Each GPS satellite broadcasts its signal with a unique code.

Following downconversion to baseband in the downconverter 604, the received signal is converted from analog to digital data by the ADC 606. The downconverter 604 further produces a clock signal which is provided to the correlator 610.

The correlator 610 multiplies the received signal by a stored replica of the appropriate code contained within its local memory and then integrates or filters the product in order to obtain an indication of the presence of the signal. By sequentially adjusting the relative timing of this stored replica relative to the received signal, and observing the correlation output, the receiver can determine the time delay between the received signal and a local clock. The initial determination of the presence of such an output is termed acquisition. Once acquisition occurs, the process enters the tracking phase in which the timing of local reference is adjusted in small amounts in order to maintain a high correlation output. The time delays measure between the receive signal from each satellite and the local clock form pseudo-ranges. The correlator 610 provides the pseudo-range data to the position processor 618. Thus, the downconverter 604, the ADC 606, and the correlator 610 in combination form a satellite receiver 624 configured to receive satellite signals from one or more satellites and produce pseudo-range data 628 in response to the satellite signals.

The cellular antenna 612 detects and transmits energy on cellular frequencies from a base station of a cellular system. The cellular transceiver 614 operates to transmit and receive voice and data information with a cellular base station of the radiocommunication system in which the mobile station 304 operates. The cellular transceiver 614 operates in response to the oscillator 622 which generates a reference frequency.

The cellular transceiver 614 is configured for two-way voice and data communication with a remote base station and to receive satellite position and clock correction curve fit data 626 transmitted from the base station. The curve fit data are provided from the transceiver 614 to the curve fit processor 616. The curve fit processor 616 may be implemented as a microprocessor or other suitable computation device within the mobile station 304. The curve fit processor 616 may also perform functions of digital signal processing and call processing in the mobile station 304. Further, the curve fit processor 616 may be implemented as a group of software instructions suitable for processing the curve fit and clock correction data received from the cellular transceiver 614. The curve fit processor 616, in a manner to be described below, calculates position and velocity vectors and clock correction data 630 in response to the curve fit and clock data 626. The position, velocity and clock information 630 are provided to the position processor 618.

The position processor 618 is coupled with the transceiver 614 and the satellite receiver 604 and configured to compute satellite positions of the one or more satellites in response to the satellite position and clock correction curve fit data 626 and the pseudo-range data 628 received from the correlator 610. The position processor 618 may be implemented as any suitable processor, such as a microprocessor or digital signal processor of the mobile station 304. Further, the position processor 618 may be implemented as a group of software instructions and associated data for processing the position velocity and clock data and the pseudo-range data.

The user interface 620 permits user control of the mobile station 304 by a user of the mobile station 304. In the illustrated embodiment, the user interface 620 includes a microphone, an earpiece, a display and a keypad.

Figure 7:
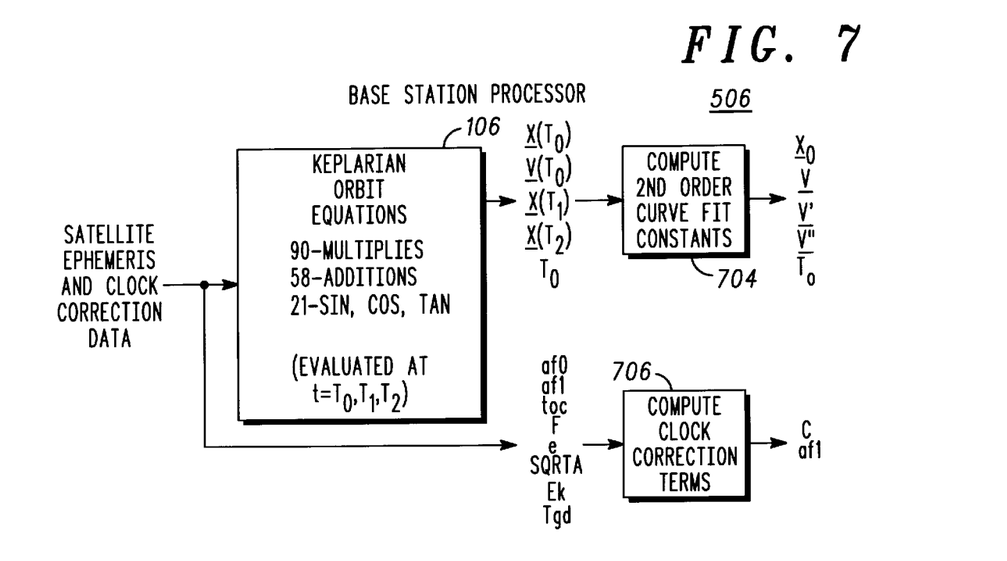
FIG. 7 illustrates operation of the processor of the base station of FIG. 5.

FIG. 7 illustrates operation of the parameter processor 506 of the base station 302 of FIG. 5 to compute satellite position curve fit data in accordance with the present invention. The procedure is illustrated in conjunction with FIG. 10.

Figure 10:
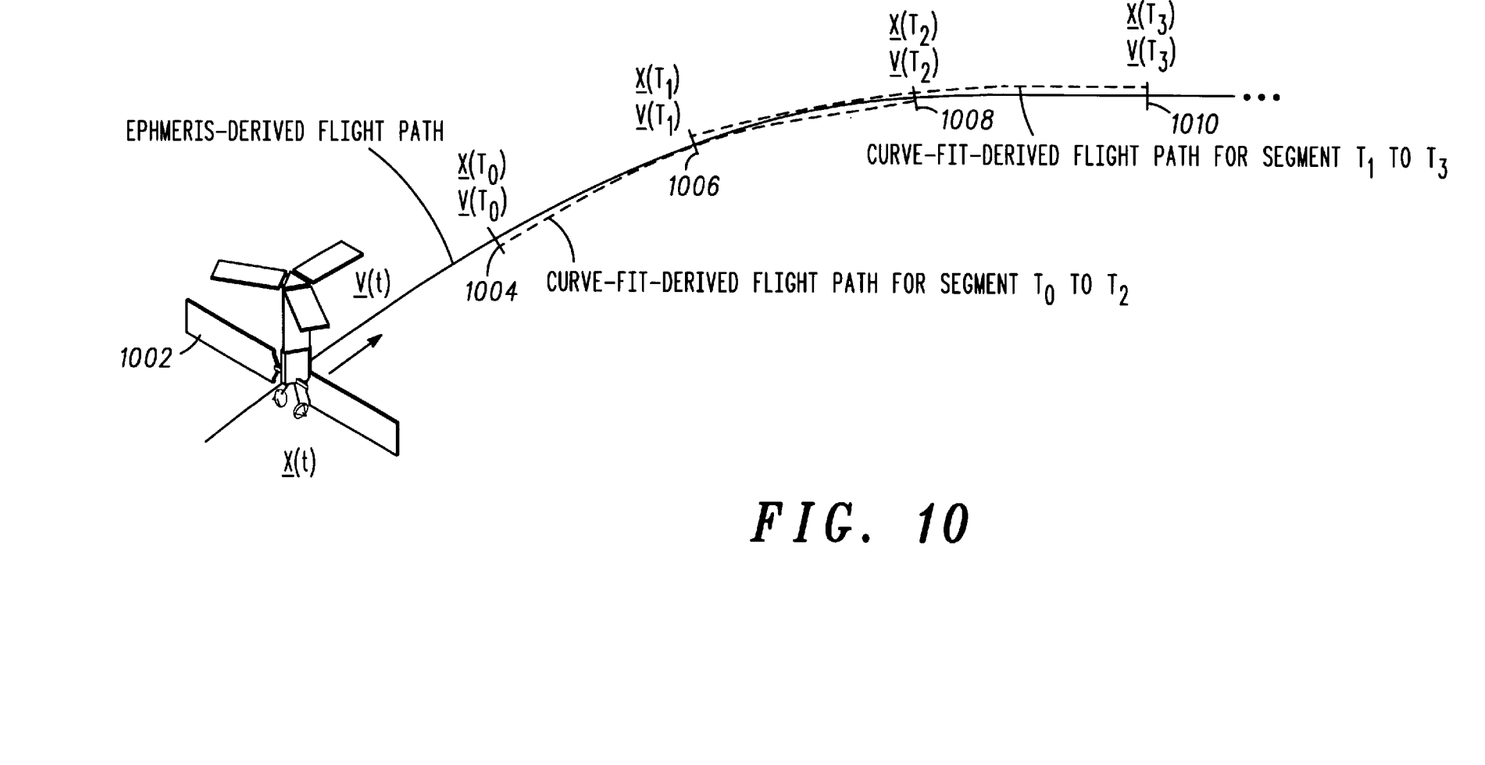
FIG. 10 illustrates estimated and actual satellite positions.

The Keplerian equations which describe motion of earth orbiting satellites are only evaluated at discrete points in time 1004, 1006, 1008, separated by some period T, say five minutes. In FIG. 10, a satellite 1002 has a position X(t) and a velocity V(t). At a first point 1004, at time $T_0$, satellite ephemeris information and clock correction information received at the base station processor 506 are used to calculate the satellite position and velocity vectors. A group of instructions 702 operating in conjunction with the base station processor 506 implements the Keplerian orbit equations to produce the position vector $X(T_0)$, and the velocity vector $V(T_0)$. At a second time 1006, labeled $T_1$ in FIG. 10, the satellite ephemeris information and clock correction information received at the base station processor 506 are used to calculate the vectors $X(T_1)$ and $Y(T_1)$. At a third time 1008, labelled $T_2$ in FIG. 10, the satellite ephemeris information and clock correction information received at the base station processor 506 are used to calculate the vectors $X(T_2)$ and $Y(T_2)$. In the illustrated embodiment, $T_2$ is different from $T_1$ by five minutes and $T_1$ is different from $T_0$ by five minutes. Other time differences may be chosen and the time differences may not be uniform. The ephemeris data is evaluated at each of the three points producing position vector and velocity vector data.

This data is then entered into a process that computes the second order curve fit vector constants. A satellite in orbit around the earth is subject to both a constant acceleration and a constant velocity. The two can be to produce a vector sum defining the position of the satellite:

$$X(t)=\tfrac{1}{2}At^2+Vt+C$$

where C is an initial displacement, not necessarily zero.

This equation describes the motion of the satellite as a simple second order equation in time. Other forces such as solar wind and gravitational variations also affect the motion of the orbiting satellite. These additional forces require that the process be extended to additional terms of the polynomial equation.

In general, any continuously varying function can be modelled with an infinite order polynomial. Thus, the motion of the satellite can be described as $$X(t)=X_0+V_0(t-T_0)+(\tfrac{1}{2})V_1(t-T_0)^2+(\tfrac{1}{3})V_2(t-T_0)^3+\ldots$$

The velocity of the satellite can be obtained directly from X(t) by taking the derivative of the function with respect to time:

$$V(t)=V_0+V_1(t-T_0)+V_2(t-T_0)^2+\ldots$$

The error introduced by truncating the infinite order polynomials to a finite order can be predicted and computed. It has been determined that limiting the X(t) polynomial to 4 terms and the V(t) polynomial to 3 terms limits the error to no more than 1 meter given a time interval of applicability (i.e., the $t-T_0$ term) of 5 minutes.

The remaining process is how best to compute the four constants $X_0$, $V_0$, $V_1$, and $V_2$. A mathematical process called a curve fit optimally selects the constants so as to minimize the total error. In order to apply this process to the orbit of a GPS satellite, the source of the satellite orbit truth model must be obtained. This source is the individual satellite's ephemeris data. The ephemeris data is precise Kepler orbit coefficients that allow the prediction of satellite position as a function of time. By using the ephemeris data, one can create a history of satellite velocity and position data as a function of time. These data points are entered into the curve-fit equations and the constants $X_0$, $V_0$, $V_1$, and $V_2$ are automatically produced.

Figure 9:
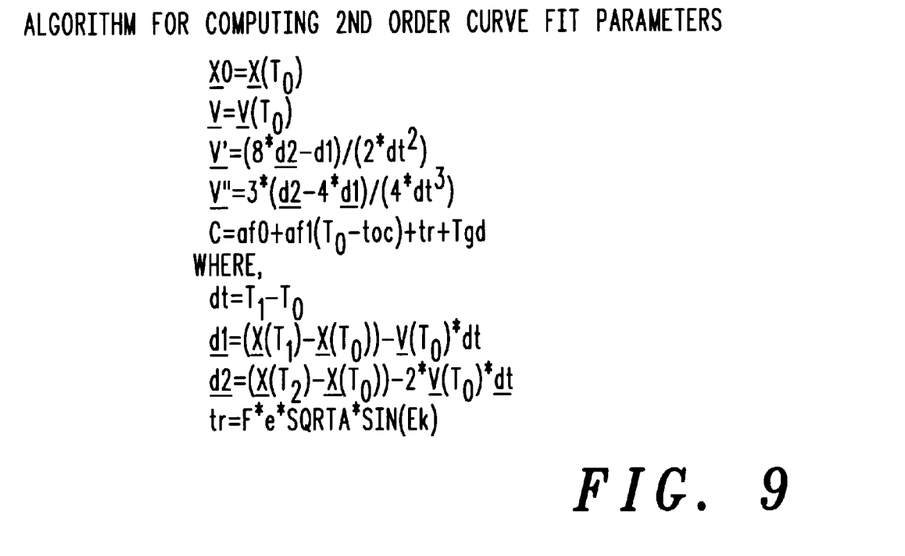
FIG. 9 illustrates calculations necessary for computing the parameters transmitted from the base station to the mobile station.

FIG. 9 illustrates the mathematical processing required for computing the second order curve fit parameters for use by the mobile station 304 in the radio communication system of FIG. 300. The position vector and velocity vector data are provided to the process 704 (FIG. 7) to compute the second order curve fit vector constants, $X_0$, $V_0$, $V_1$, $V_2$. Further, the clock correction data received at the base station processor 506 is provided to a third group of software instructions 706. These instructions 706 compute the clock correction terms C and af1.

The second order curve fit parameters are computed as follows:

$$X_0 = X(T_0)$$

$$V = V(T_0)$$

$$V' = \frac{8d2 - d1}{2dt^2}$$

$$V'' = 3\frac{d2 - 4d1}{4dt^3}$$

$$C = af0 + af1(T_0 - toc) + tr + Tgd$$

where
dt=$T_1$-$T_0$
d1=(X($T_1$)-X($T_0$))-V($T_0$)dt
d2=(X($T_2$)-X($T_0$))-2V($T_0$)dt
tr=Fe$\sqrt{A}$sin(Ek)

In this manner, the ephemeris data is evaluated at the base station 302 at each of the three points, $T_0$, $T_1$ and $T_2$, producing position vector and velocity vector data X(T0), V(T0), X(T1), V(T1), X(T2), and V(T2). After computing the curve fit vector constants, $X_0$, $V_0$, $V_1$, and $V_2$, the three axis resulting polynomial is evaluated to produce a quadratic equation for the position and velocity vector of the satellite over the period of time from $T_0$ to $T_2$.

In one embodiment using the curve fit technique at 1 Hz, for 12 satellites evaluated at five minute intervals, the total multiply and add operations required of the mobile station processor is only 8 percent of the requirement for doing a traditional ephemeris evaluation at 1 Hz for 12 satellites of five minute intervals.

The curve fit parameters are updated in synchronism with the start of the next five minute interval so that the process can run continuously. The error in the curve fit solution as compared to the ephemeris computed solution can be constrained and predicted. The error can be reduced by reducing the update time below five minutes or by carrying one or two additional terms of the curve fit process (i.e., turning it into a fourth or fifth order equation). Also, the number of bits used for storing the curve fit parameters $X_0$, $V_0$, $V_1$, and $V_2$ will effect the error as well. However, given a second order position curve fit and five minute update intervals, satellite position errors are constrained well below one meter.

Figure 8:
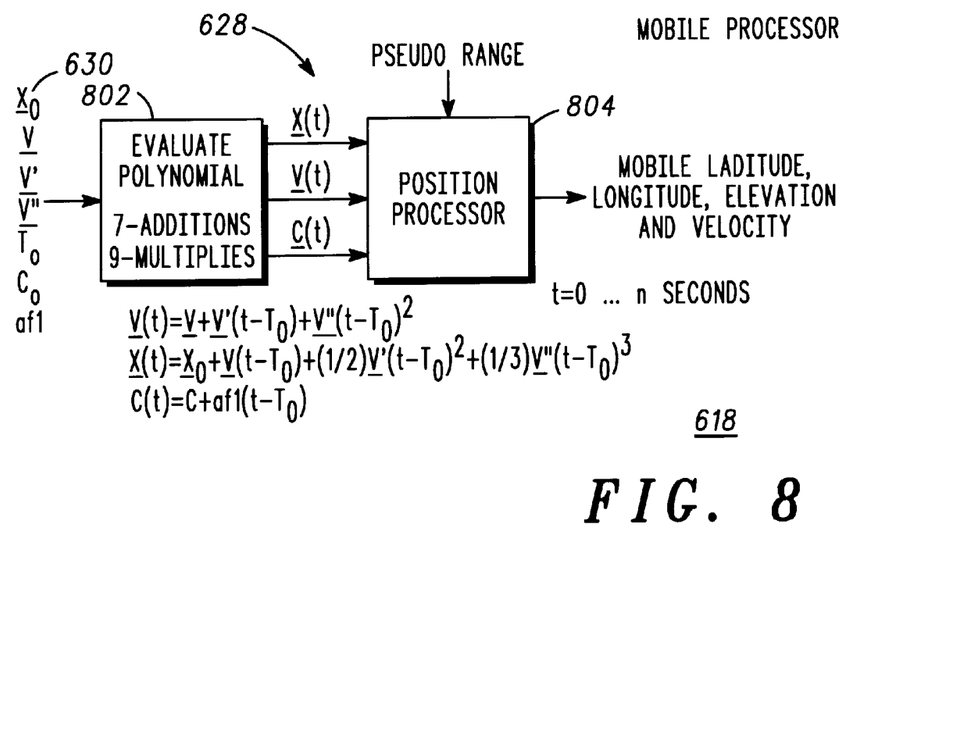
FIG. 8 illustrates operation of the processor of the mobile station of FIG. 6.

FIG. 8 illustrates operation of the position processor 618 of the mobile station 304 of FIG. 6 to compute mobile station position in accordance with the present invention. The mobile processor receives the curve fit and clock parameters 630 which have been received and decoded by the cellular transceiver 614 of the mobile station 304 (FIG. 6). In FIG. 8, the position processor 618 includes a polynomial evaluation stage 802 and a position processing stage 804. The polynomial evaluation stage 802 evaluates X(t), Y(t) and C(t) according to the following equations, using the curve fit parameters $X_0$, V, V', V'', $T_0$, $C_0$ and af1:

$$X(t)=X_0+V(t-T_0)+(\tfrac{1}{2})V'(t-T_0)^2+(\tfrac{1}{3})V''(t-T_0)^3$$

$$V(t)=V+V'(t-T_0)+V''(t-T_0)^2$$

$$C(t)=C+af1(t-T_0)$$

The position, velocity and clock vectors are provided to the position processing stage 804. The position processing stage 804 uses these vectors and the pseudo-range data 628 to calculate the latitude, longitude, elevation and velocity of the mobile station 304.

In one embodiment, the number of bits per satellite required to implement this design while maintaining adequate accuracy in position determination has been determined to be as follows:

| Parameter | No. Bits | LSB Scale |
|---|---|---|
| $X_0$ | 22 | $2^4$ |
| $V_0$ | 17 | $2^{-4}$ |
| $V_1$ | 12 | $2^{-11}$ |
| $V_2$ | 8 | $2^{-19}$ |

A total of 255 bits per satellite must be transmitted over the communication link from the base station to the mobile station to convey the satellite position curve fit data. As mentioned earlier, a total of 576 bits per satellite must be transmitted over the communication link from the base station to the mobile to convey the satellite raw ephemeris and clock correction data. Consequently, the technique of transmitting curve fit parameters for satellite position and clock correction reduces the total number of bits by 255/576, or only 44% of the total number of original bits.

The computational load at the mobile station has been substantially reduced. The computational load of the curve fit process is only 8% of that required to use the traditional ephemeris calculations to determine a string of satellite position and velocity solutions.

The satellite velocity curve fit and clock correction parameters, once they are delivered to the mobile, frees the mobile from having to predict the Doppler for all satellites in order to acquire the signals. In previous art, the GPS receiver in the mobile needed to maintain a satellite almanac or ephemeris data internally to predict which satellites are visible and the corresponding Doppler shift for each satellite in order to acquire the signal. The velocity and position curve fit parameters can be used to predict very precisely the Doppler for each visible satellite, thus eliminating the need to maintain satellite almanac or ephemeris data internally to the mobile. In addition, the satellite position curve fit and clock correction data can be used to predict the possible range of code phases over which the satellite signal will exist at the mobile station. In this way, the mobile station is freed from having to search the entire pseudo-random noise code phase space, allowing the search to be completed in less time. In this way, the satellite velocity and position curve fit parameters and the clock correction parameters act in such a way so as to form an aide in the acquisition of the satellite signals, allowing the search for such signals to occur in less time.

Figure 11:
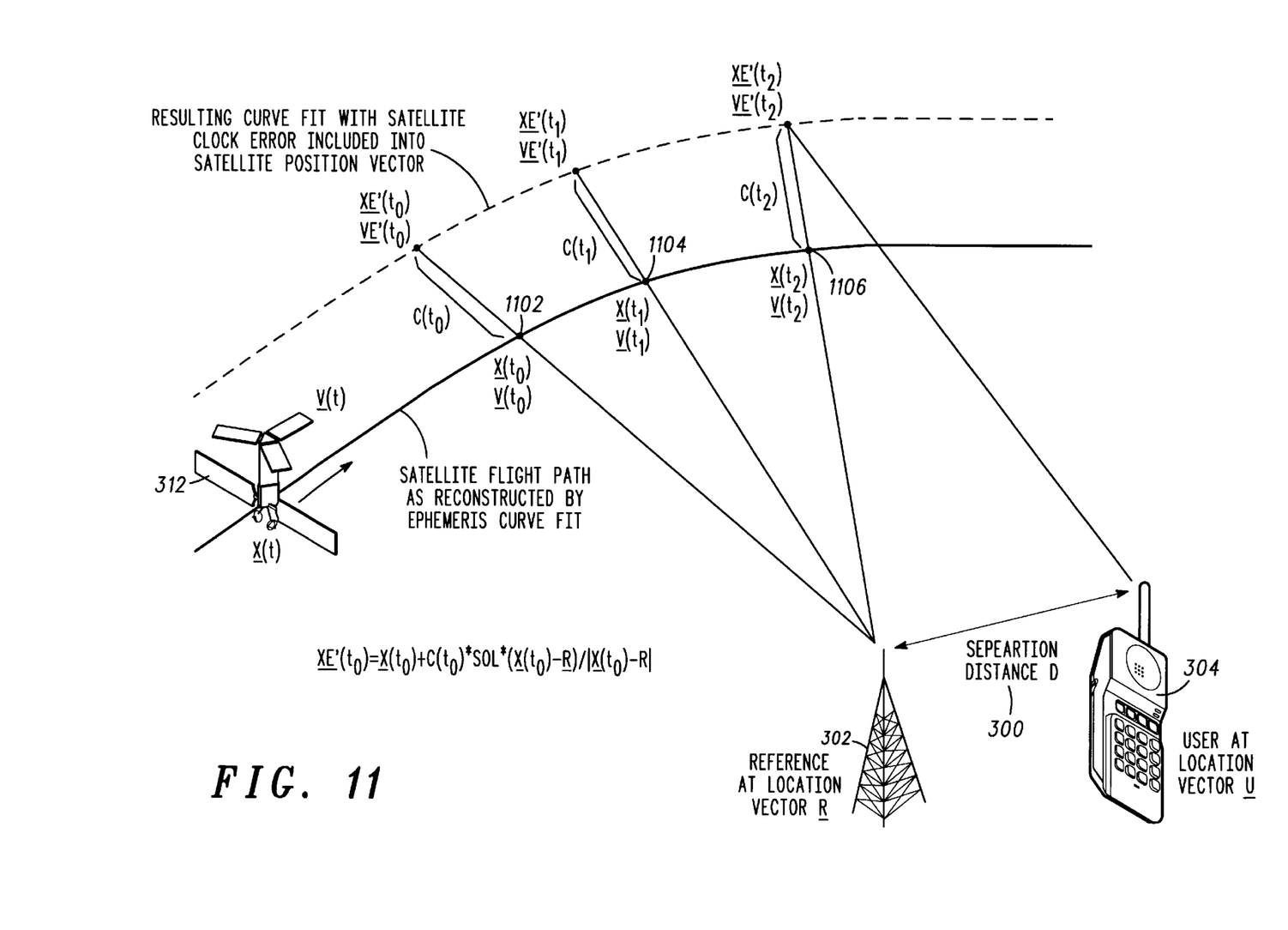
FIG. 11 illustrates estimated and actual satellite positions.

FIG. 11 illustrates estimated and actual satellite positions. In FIG. 11, provision is made for combining the satellite position curve fit data with the satellite clock correction parameters. This permits elimination of the clock correction parameters completely and reduces even further the number of bits to be transmitted from 254 bits to 217 bits per satellite. In order to accomplish this, the effect of the clock error must be translated into an equivalent satellite position error. This is illustrated in FIG. 11.

In FIG. 11, a satellite 312 of a global navigation positioning system such as GPS orbits above a radio communication system 300. The radio communication system 300 includes a plurality of base stations 302 in two-way radio communication with mobile stations such as mobile station 304. As was illustrated in FIG. 10, ephemeris data is received and curve fit data are calculated at successive points in time, such as point 1102, point 1104 and point 1106. The curve fit data are transmitted from the base station 302 to the mobile station 304 after predetermined intervals, such as five minutes.

Translating the effect of clock error into equivalent satellite position error requires that the satellite orbit curve fit $X(t)$ be modified by an amount corresponding to the satellite clock correction. Effective range extensions $C_0$, $C_1$, and $C_2$ are computed from the satellite clock correction as derived from the ephemeris data at time $t_0$, $t_1$, and $t_2$ multiplied by the speed of light (SOL). This magnitude can be either positive (farther away) or negative (closer to the mobile station), but typically is on the order of less than 1 ms (but can be has large as 5 ms).

The effective position XE'(t) is calculated as follows:

$$XE'(t_0) = X(t_0) + C(t_0)SOL\left(\frac{X(t_0) - R}{|X(t_0) - R|}\right)$$

In order to modify the effective satellite orbit, a reference point RL is required to project the satellite orbit position along the line extending between its true position $X(t)$ and the RL. The RL can conveniently be the base station 302. Simple vector mathematics modifies the satellite orbit path $X(t)$ to the modified orbit path $X'(t)$.

Choosing each individual base station of the system 300 as the reference site allows for control of the error induced in the range measurement. It is assumed that the base station 302 is within 10 Km of the mobile station 304 (valid most of the time in cellular systems). Also, it is known that the satellite clock correction cannot be any larger than 5 ms, since this is the maximum magnitude of the parameter. The maximum error in satellite predicted range is a function of this clock error and the base station-to-mobile-station separation distance. The maximum error in the measured range based on the modified or projected satellite orbit, a 10 Km mobile to reference point distance, and 5 ms of clock correction is approximately 1 meter, which is acceptably small given other system errors such as multipath, receiver noise, ionospheric delay, and other quantization effects.

From the foregoing, it can be seen that the present invention provides an improved method and apparatus for location determination in a radio communication system. A base station of the radio communication system receives satellite transmissions including satellite ephemeris information. Periodically, the base station calculates curve fit data which is transmitted to a mobile station. In response to the curve fit data, the mobile station determines the position of the satellites in the system. In this manner, the amount of data that must be received at the mobile station is substantially reduced, as well as the computational load imposed on the mobile station. As a result, power drain in the mobile station is reduced and the processor of the mobile station is freed up for other tasks.

In another embodiment, the curve fit process is adjusted to absorb the clock correction term (C(t)) into the satellite position and velocity terms X(t) and Y(t). By this technique, the number of bits necessary to transmit the curve fit data from the base station to the mobile station is reduced.

In another extension, any satellite station such as a GPS station can receive the curve fit data to reduce the time required to acquire the satellite system. The curve fit data reduce the range of data that must be searched to locate the satellite signals from the satellites. Thus, the computational complexity and the time required for system acquisition are reduced.

While a particular embodiment of the present invention has been shown and described, modifications may be made. For example, other types of radio systems besides two-way radio systems may be adapted to employ the principles of the present invention. It is therefore intended in the appended claims to cover such changes and modifications which follow in the true spirit and scope of the invention.

What is claimed is:

1. A method for position location by a mobile station in a radio communication system, the method comprising the steps of:
   receiving at the mobile station satellite position curve fit data transmitted from a base station of the radio communication system; and
   determining a position of the mobile station using the satellite position curve fit data.

2. The method of claim 1 further comprising the steps of:
   receiving at the mobile station from the base station clock correction curve fit data; and
   determining the position of the mobile station using the clock correction curve fit data.

3. The method of claim 1 wherein receiving the satellite position curve fit data comprises the steps of:
   receiving data related to position and velocity of a plurality of earth orbiting satellites.

4. The method of claim 3 wherein determining the position of the mobile station comprises the steps of:
   determining positions of each satellite of the plurality of satellites using the data; and
   determining the position of the mobile station using the positions of each satellite.

5. The method of claim 4 further comprising the steps of:
   receiving a signal at the mobile station from at least some satellites of the plurality of satellites;
   in response to the signal, determining pseudo-ranges between the mobile station and the at least some satellites; and
   determining the position of the mobile station using the positions of each satellite and the pseudo-ranges.

6. The method of claim 1 wherein receiving the satellite position curve fit data comprises:
   receiving a broadcast transmission of the base station; and
   detecting the satellite position curve fit data in the broadcast transmission.

7. The method of claim 6 wherein receiving the broadcast transmission comprises the step of:
   detecting a paging channel transmitted by the base station for all mobile stations in a geographic area served by the base station.

8. The method of claim 1 wherein receiving the satellite position and clock correction curve fit data comprises:

detecting a point-to-point transmission from the base station intended for the mobile station.

9. The method of claim 8 further comprising the steps of:
transmitting from the mobile station to the base station a request for position data; and
receiving the satellite position curve fit data in response to the request.

10. A method for mobile station location determination in a radio communication system which includes a plurality of base stations configured for radio communication with at least one mobile station, the method comprising the steps of:
   (a) receiving at a base station of the radio communication system satellite ephemeris information and clock correction information for at least one earth orbiting satellite;
   (b) transmitting from the base station at predetermined intervals satellite position curve fit data and clock correction data;
   (c) at a mobile station, receiving the satellite position curve fit data and the clock correction data; and
   (d) at the mobile station, determining a position for the at least one satellite using the satellite position curve fit data and clock correction data.

11. The method of claim 10 further comprising the step of:
   (e) at the mobile station, determining a position of the mobile station using the position for the at least one satellite.

12. The method of claim 11 further comprising the steps of:
   (f) at the mobile station, receiving next satellite position curve fit data and clock correction data after a predetermined interval; and
   (g) updating the position of the mobile station in response to the next satellite position and curve fit data.

13. The method of claim 10 wherein step (a) comprises:
receiving the satellite ephemeris information and clock correction information at the base station directly from the at least one earth orbiting satellite.

14. The method of claim 10 wherein step (a) comprises:
receiving the satellite ephemeris information and clock correction information at the base station from another location in the radio communication system.

15. The method of claim 10 wherein step (b) comprises a step of:
broadcasting the data for reception by all mobile stations in a geographic area served by the base station.

16. The method of claim 10 wherein step (b) comprises a step of:
transmitting the data on a paging channel of the radio communication system.

17. The method of claim 10 further comprising the step of:
   (e) transmitting data indicative of the position of the mobile station to a base station of the radio communication system.

18. A radiotelephone comprising:
a transceiver configured for two-way communication with a remote base station and to receive satellite position curve fit data transmitted from the base station;
a satellite receiver configured to receive satellite signals from one or more satellites and produce pseudo-range data in response to the satellite signals; and
a processor coupled with the transceiver and the satellite receiver and configured to compute satellite positions of the one or more satellites in response to the satellite position curve fit data and the pseudo-range data.

19. The radiotelephone of claim 18 wherein the transceiver is further configured to receive data corresponding to clock correction data, the processor being responsive to the clock correction data to calculate the satellite positions.

20. The radiotelephone of claim 18 wherein the processor is further configured to update the satellite positions using the satellite position curve fit data received from a base station of the system after a predetermined interval.

21. A base station for a radio communication system, the base station comprising:
means for receiving satellite ephemeris information and clock correction information;
a processor configured to compute satellite position curve fit data in response to the satellite ephemeris data and clock correction information; and
a transmitter coupled to the processor and configured to transmit the satellite position curve fit data at predetermined intervals.

22. The base station of claim 21 wherein the means for receiving comprises a global positioning system (GPS) receiver at the base station.

23. The base station of claim 21 wherein the means for receiving comprises an input for receiving the satellite ephemeris information and clock correction information from another location in the radio communication system.

24. A method of position location by a mobile station in a radio communication system, the method comprising the steps of:
receiving raw satellite ephemeris and clock correction data for a plurality of satellites at a base station of the radio communication system;
using the raw satellite ephemeris, computing the true satellite position and velocity data points for the plurality of satellites at at least three periods of time over a predetermined interval;
using the clock correction data, computing clock corrections at the at least three periods of time over the predetermined interval;
selecting a reference point that is near the mobile station;
projecting the satellite position and velocity data points away from the reference point by an amount corresponding to the propagation delay associated with the clock correction data at each of the at least three periods of time;
determining curve fit parameters for the projected satellite position and velocity data points;
transmitting the curve fit parameters to the mobile station; and
at the mobile station, using the curve fit parameters for the projected satellite position and velocity data points to compute position of the mobile station.

25. The method of claim 24 wherein the step of determining curve fit parameters comprises a step of determining a plurality of parameters related to satellite position and velocity at the at least three periods of time.

26. The method of claim 24 further comprising the steps of receiving satellite signals at the mobile station from at least some satellites of the plurality of satellites;
in response to the satellite signals, determining pseudo-ranges between the mobile station and the at least some satellites; and
determining the position of the mobile station using the positions of each satellite and the pseudo-ranges.

27. A global positioning system (GPS) station comprising:
a local receiver configured to receive satellite position curve fit data for one or more satellites from a local transmitter; and a processor configured to determine positions of the one or more satellites using the satellite position curve fit data.

28. The GPS station of claim 27 further comprising a satellite receiver configured to receive satellite signals broadcast by the one or more satellites, the processor being further configured to determine position of the GPS station using the positions of the one or more satellites and the satellite signals.

29. The GPS station of claim 28 wherein the local receiver is further configured to receive clock correction data from the local transmitter, the processor being further configured to determine the position of the GPS station using the clock correction data.

30. A method of assisting satellite acquisition by a mobile radio, the method comprising the steps of:

receiving at the mobile radio satellite position curve fit data for one or more satellites transmitted from a local transmitter; and at the mobile radio, determining a restricted range of satellite Doppler and code phase search to reduce acquisition time of the one or more satellites.

31. The method of claim 30 further comprising the steps of:

receiving at the mobile radio satellite signals broadcast by the one or more satellites;

searching the restricted range of satellite Doppler and code phase; and locating at least some of the satellite signals.

32. The method of claim 31 further comprising the step of using the satellite position curve fit data, determining positions of the one or more satellites.

33. The method of claim 32 further comprising the steps of:

receiving at the mobile radio clock correction data for the one or more satellites transmitted from the local transmitter; and using the clock correction data and the positions of the one or more satellites, determining position of the mobile radio.

* * * * *